United States Patent [19]

Soda et al.

[11] Patent Number: 4,713,710
[45] Date of Patent: Dec. 15, 1987

[54] COMPACT MULTIPLE MAGNETIC HEAD APPARATUS

[75] Inventors: Yutaka Soda, Tokyo; Hideko Imamura, Ibaragi; Hiroyuki Uchida; Tetsuo Sekiya, both of Tokyo, all of Japan

[73] Assignee: Sony Corporation, Tokyo, Japan

[21] Appl. No.: 833,396

[22] PCT Filed: Jun. 21, 1985

[86] PCT No.: PCT/JP85/00351
§ 371 Date: Feb. 25, 1986
§ 102(e) Date: Feb. 25, 1986

[87] PCT Pub. No.: WO86/00456
PCT Pub. Date: Jan. 16, 1986

[30] Foreign Application Priority Data

Jun. 25, 1984 [JP] Japan .................. 59-130718

[51] Int. Cl.$^4$ .................. G11B 5/31; G11B 5/105; G11B 5/265
[52] U.S. Cl. .................. 360/121; 360/125; 360/129
[58] Field of Search .................. 360/121, 125, 129

[56] References Cited

U.S. PATENT DOCUMENTS 4,494,160 1/1985 Bakker .................. 360/125

FOREIGN PATENT DOCUMENTS 1339091 11/1973 United Kingdom .

Primary Examiner—John H. Wolff
Attorney, Agent, or Firm—Hill, Van Santen, Steadman & Simpson

[57] ABSTRACT

The present invention is to construct a combination magnetic head apparatus in which thin film type magnetic head element portions, circuits and circuit parts accompanying therewith are mounted on first and second magnetic shield plates to thereby construct a recording head and a reproducing head and both the magnetic shield plates are bonded together at the back surfaces thereof with the result that the apparatus can be made small in size, the assembling thereof can be simplified and the accuracy thereof can be improved.

1 Claim, 7 Drawing Figures

COMPACT MULTIPLE MAGNETIC HEAD APPARATUS

TECHNICAL FIELD

The present invention relates to a combination magnetic head apparatus in which a recording magnetic head or, in some case, a recording magnetic head including an erase magnetic head for erasing a recording previously recorded on a magnetic recording medium and a reproducing magnetic head are sequentially arranged along the relative transportation direction of the magnetic recording medium so as to be integrated in one body, more particularly, to a combination magnetic head apparatus that is made by combining, for example, a thin film electromagnetic induction type magnetic head and a reproducing magnetic head of a thin film magneto-resistance effect (hereinafter referred to as MR) type.

BACKGROUND ART

A combination magnetic head apparatus in which a recording magnetic head and a reproducing magnetic head are integrated in one body is made such that, as shown, for example, in FIG. 1 which is a schematic representation of its location and construction, respective magnetic gaps GR and GP of a recording magnetic head HR and a reproducing magnetic head HP are arranged along the direction as shown by an arrow a in FIG. 1 along which a recording medium is transported.

In this case, in the respective recording magnetic head HR and the reproducing magnetic head HP, magnetic head element portions 1R and 1P each having magnetic head elements prepared for a single or a plurality of channels are located at their front portions and resinous mold bodies 2R and 2P incorporating circuit portions, such as, integrated circuits accompanying therewith or the like respectively construct block bodies and they are bonded together with a reference plane fs as the center abutting surfaces 3R and 3P provided on these block bodies, or resinous mold members 2R and 2P and each of which constructs a reference flat plane. The magnetic gaps GR and GP of the recording magnetic head HR and the reproducing magnetic head HP are respectively located such that their depth directions SR and SP have symmetrical inclinations of a predetermined angle $\theta$, for example, $\theta = 4°$ relative to the reference central plane fs. Contact surfaces 4R and 4P of the respective magnetic heads HR and HP with the magnetic medium are formed by, for example, cylindrical polishing with a predetermined radius of curvature around respective points on the depth directions SR and SP of the magnetic gaps GR and GP.

In the combination magnetic head thus being arranged, since it is difficult that the distance between the magnetic gaps GR and GP of the respective recording and reproducing magnetic heads HR and HP is made short enoughly, it is therefore difficult that a contact relation or so-called abutting of the magnetic gaps GR and GP with the magnetic medium is maintained satisfactorily. There is further such a defect that the outer dimension of the overall arrangement thereof becomes large. Further, there are defects that its humidity-proof property and environment-proof property for the integrated circuits are low and that when the magnetic heads are assembled, the number of bonding wires required by the integrated circuit or the like is increased.

The present invention is to improve the afore-said defects encountered with the above mentioned combination magnetic head apparatus.

DISCLOSURE OF INVENTION

A recording head portion is constructed in which a recording magnetic head element portion, a recording integrated circuit and a capacitor are arranged on one surface of a first magnetic shield plate. While, a reproducing head portion is constructed in which a reproducing magnetic head element portion, a reproducing integrated circuit and a capacitor are arranged on one surface of a second magnetic shield plate. These head portions are bonded together at the other surfaces of the respective magnetic shield plates and the whole thereof is incorporated in a shield case.

The magnetic head element portion is formed of a thin film magnetic head element formed on a magnetic substrate bonded on the first magnetic shield plate and a protective substrate is bonded thereto to cover its upper side.

The reproducing magnetic head element portion is formed of a thin film magnetic head element formed on a magnetic substrate bonded on the second magnetic shield plate and a protective substrate is bonded thereto to cover its upper side.

On these recording head and reproducing head, there are formed magnetic medium contact surfaces by the cylindrical polishing in which the center of the polishing is provided at the position displaced from the line on the depth direction of the respective magnetic gaps.

BEST MODE FOR CARRYING OUT THE INVENTION

Figure 1:
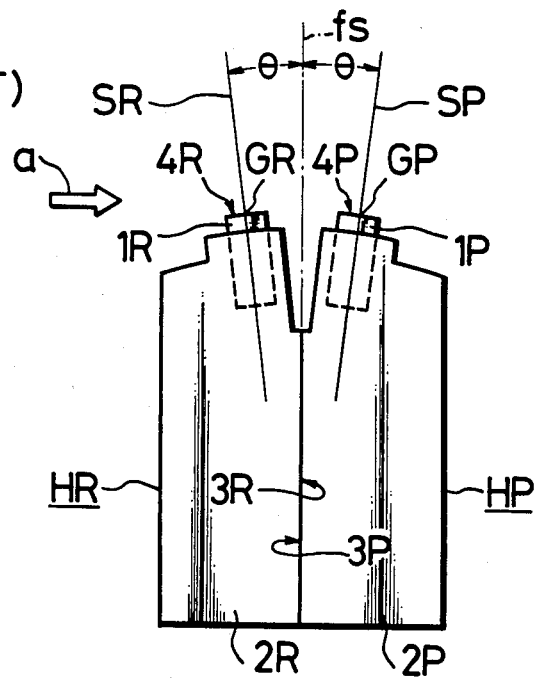
FIG. 1 is a layout representation of a prior art combinatoin magnetic head apparatus.

An embodiment of a combination magnetic head apparatus according to the present invention will be described with reference to FIG. 2 and the followings. In the figure, reference numeral 31 designates an overall arrangement of the combination magnetic head apparatus of the present invention.

In the present invention, a recording head portion and a reproducing head portion are formed on a first magnetic shield plate $SH_1$ and a second magnetic shield plate $SH_2$. Each of the first and second magnetic shield plates $SH_1$ and $SH_2$ is formed of a plate-shaped member having a highly accurate flatness and made of high magnetic permeability soft magnetic material, such as permalloy.

A recording magnetic head element portion 1R is attached to a front end of one surface of the first magnetic shield plate $SH_1$, while a ceramic substrate 34 on which accompanying electrical parts such as a capacitor 33 for stabilizing a voltage source of a recording integrated circuit 32 and so on are mounted is attached to the rear end thereof.

Also, a reproducing magnetic head element portion 1P is attached to a front end of one surface of the second magnetic shield plate SH$_2$, while a ceramic substrate 37 on which accompanying electrical parts, such as an integrated circuit 35 for reproducing, a capacitor array 36 for deriving a signal and so on are mounted is attached to the rear end portion.

Conductive patterns are formed on these ceramic substrates 34 and 37 to interconnect the respective integrated circuits 32 and 35 and the circuit elements, that is, capacitors 33 and 36 and so on with predetermined patterns. Respective parts are connected through, for example, lead wires 70 and 71 with a predetermined interconnection relationship, whereby to form the circuits accompanying with the respective heads.

Figure 3:
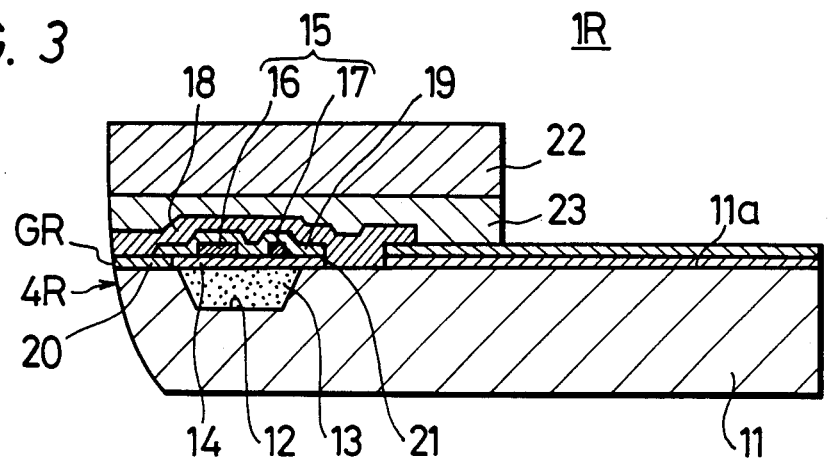
FIGS. 3 and 4 are a cross-sectional view and a plan view of an example of a recording head portion thereof.
Figure 4:
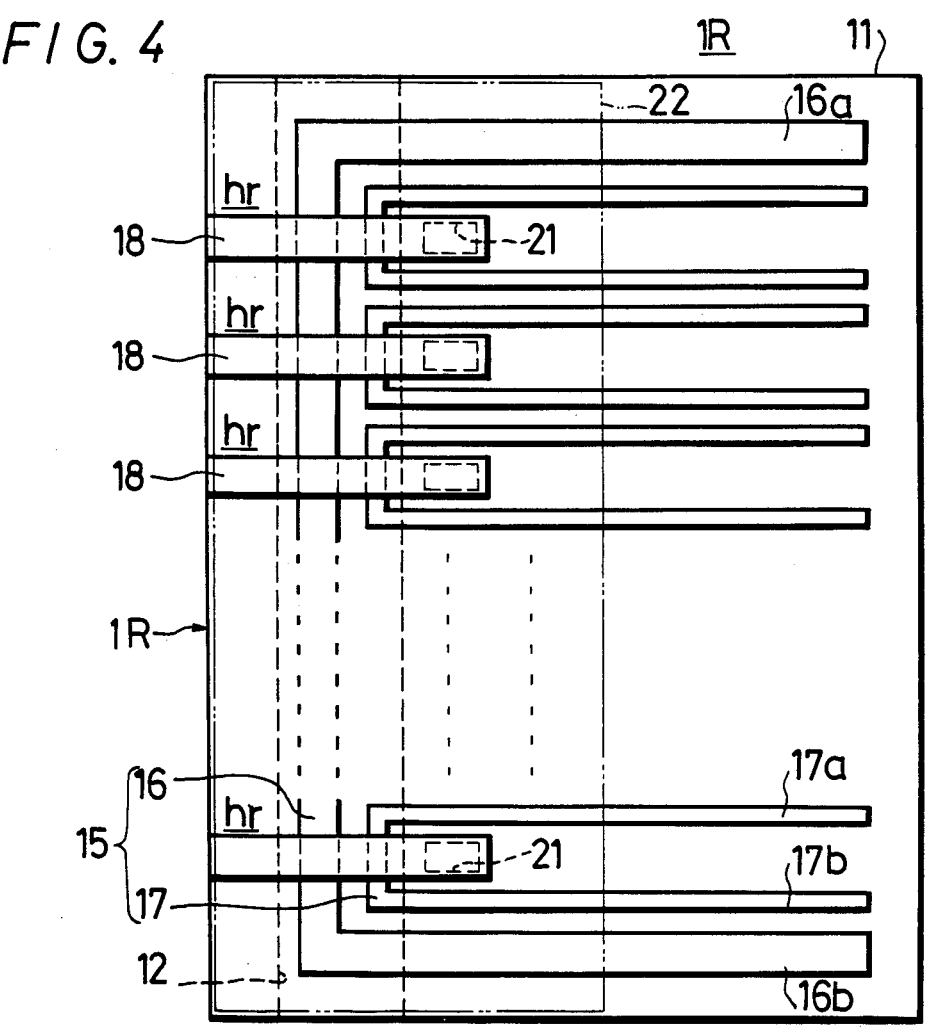

The recording magnetic head element portion 1R is, as shown in, for example, FIG. 3 which is an enlarged plan view thereof and FIG. 4 which is a plan pattern view thereof, formed such that electromagnetic induction type thin film magnetic head elements hr corresponding to a large number of channels are arranged in parallel to each other on a magnetic substrate 11 made of Mn-Zn ferrite, Nn-Ni ferrite and so on. In this case, on the substrate 11, there is formed a groove 12 which is filled with a non-magnetic material 13, for example, glass. The grove 12 is formed in the substrate and filled by the glass to form a common planar surface 11a with the substrate 11 and extended along the longitudinal direction of the substrate 11. When the substrate 11 has conductivity, on the major surface 11a of the substrate 11, there is deposited a non-magnetic insulating layer 14 such as SiO$_2$ and the like on which conductor means 15 is deposited. This conductor means 15 is formed of, fo example, a band-shaped thin film conductive member 16 which becomes a bias coil common to all channels (tracks) and a band-shaped thin film conductive member 17 which becomes a signal coil prepared to each channel. These conductive members 16 and 17 are arranged at least partly to be laid along the groove 13. A thin film magnetic layer 18 made of such as permalloy and the like is formed across the groove 13 and the conductor means 15 formed thereon in association with each channel. In this case, an insulating layer 19 such as SiO$_2$ and the like is deposited on the conductor means 15 to electrically insulate the same from the thin film magnetic layer 18. One end of each magnetic layer 18 forms an operational magnetic gap GR through a non-magnetic gap spacer 20 formed, for example, by the insulating layer 19 between it and the substrate 11, while the other end thereof is magnetically and tightly coupled to the surface 11a of the substrate 11a via a window 21 bored, for example, through the insulating layers 19 and 14. In this way, the common substrate 11 and each magnetic layer 18 constitute each closed magnetic path and thereby the magnetic head element hr of each channel is formed.

On each magnetic head element hr, there is bonded a protective substrate 22 having excellent wear-proof property through a bonding agent 23 in opposing relation to the substrate 11. These substrates 11 and 22 are polished to form a magnetic medium contact surface 4R to which the magnetic gap GR is faced.

Both end portions 16a, 16b and 17a, 17b of the thin film conductive members 16 and 17 of the conductor member 15 are, on the other hand, extented to the rear side edge of the substrate 11 to form terminals which are respectively connected to the external circuits, for example, to the recording integrated circuit 32 mounted on the aforesaid ceramic substrate 34. In this case, the width of the protective substrate 22 is selected to be narrower than that of the magnetic substrate 11 to thereby expose the respective terminals 16a, 16b and 17a, 17b outside the protective substrate 22. The terminals 16a, 16b and 17a, 17b extended on this substrate 11 are respectively connected through the lead wires 70 to the circuit portions formed on the ceramic substrate.

Figure 5:
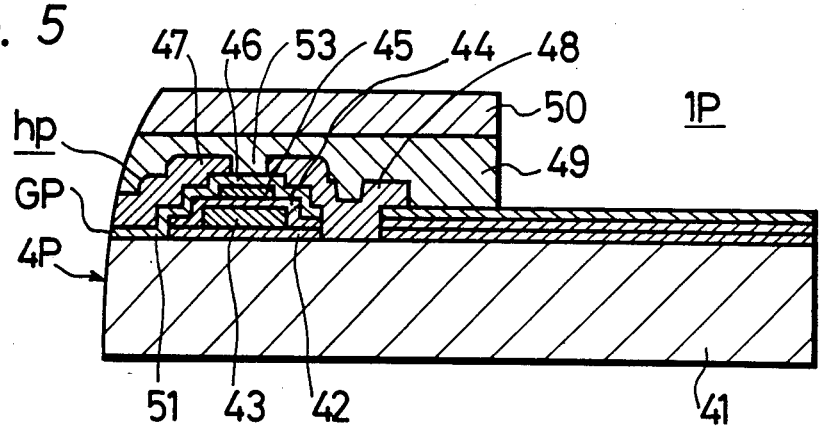
Figure 6:
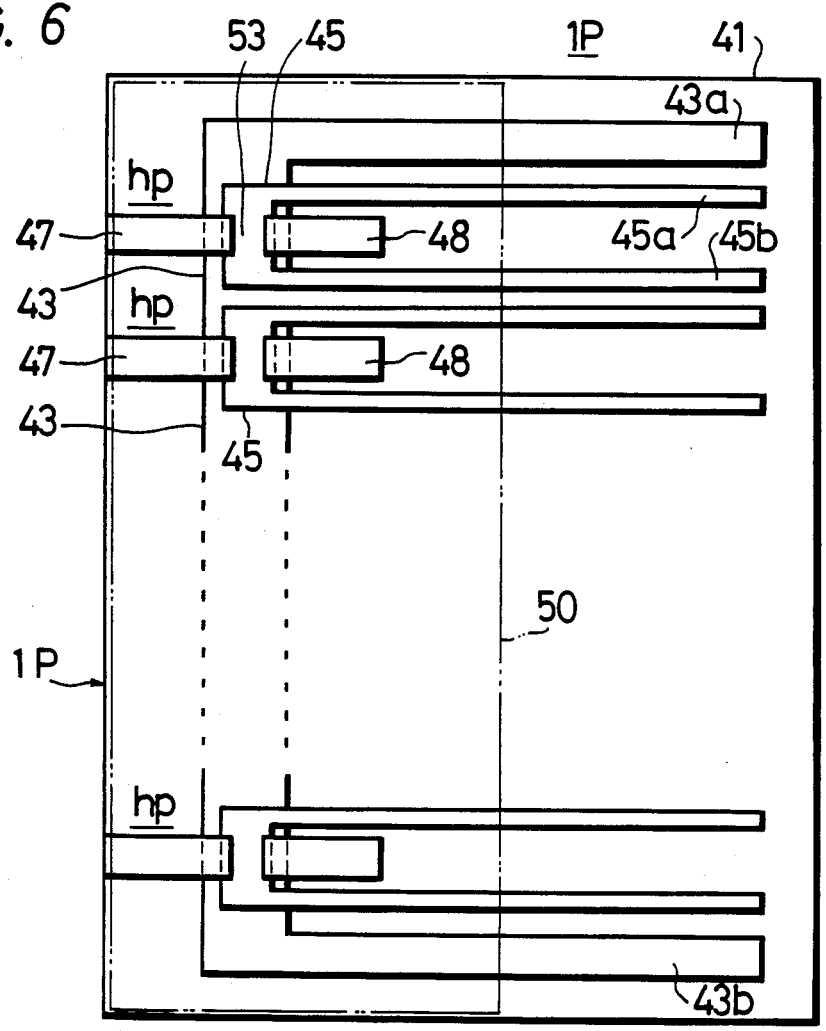

While, the reproducing magnetic head element portion 1P is formed, as shown in FIG. 5 which is an enlarged cross-sectional view thereof and FIG. 6 which is an enlarged plan view thereof, such that in response to the respective head elements hr of the aforesaid recording magnetic head element portion 1R, reproducing magnetic head elements hp corresponding to the respective channels are arranged on a common substrate 41.

The substrate 41 is made of, for example, Ni-Zn ferrite or Mn-Zn ferrite and the like. When this substrate 41 has conductivity, through an insulating layer 42 such as SiO$_2$ or the like on this substrate and then on a bias conductive member 43 made of a band-shaped conductive film which becomes a bias magnetic field generating current path for applying a bias magnetic field to an MR thin film element 45 which will be described later, there is formed through an insulating layer 44 the MR thin film element 45 made of such as Ni-Fe alloys, Ni-Co alloys or the like and having a magneto-resistance effect. On this MR thin film element 45, there are respectively formed through a thin insulating layer 46 a pair of magnetic layers 47 and 48 made of, for example, M$_0$ permalloy which becomes a part of magnetic cores of magnetic circuits and one ends of which are extended in the direction across the bias conductive member 43 and the MR thin film element 45. A protective substrate 50 is bonded to the substrate 41 via a bonding agent 49. Between the front end of one magnetic layer 47 and the substrate 41, there is interposed a non-magnetic gap spacer layer 51 made of, for example, the insulating layer 46 and having a predetermined thickness to form a front magnetic gap GP. In facing relation to this magnetic gap GP, a magnetic medium contact surface 4P is formed over the substrates 41 and 50 by polishing. While the rear end of the magnetic layer 47 forming the magnetic gap GP and the front end of the other magnetic layer 48 are formed on the MR thin film element 45 via the insulating layer 46 to ride thereon, respectively, a discontinuous portions 53 with a predetermined width is formed between both the ends to make the same distant apart. While the rear end and the front end of both the magnetic layers 47 and 48 are electrically insulated from the MR element 45 by the insulating layer 46 at both sides thereof, they are coupled to each other magnetically. As described above, both the magnetic layers 47 and 48 through the discontinuous portions 43 are magnetically coupled by the MR elements 45 and thus the MR type head elements hp are formed, in which the magnetic circuit is formed of the substrate 41, the magnetic gap GP, the magnetic layer 47, the MR element 45, the magnetic layer 48 and the substrate 41. Also in this case, respective end portions 43a and 43b of the bias conductive member 43 and both ends of each MR thin film element 45 in each head element hp are respectively extended to the end portion of the substrate 41 that is not covered with the protective substrate 50 to thereby form on predetermined portions of the circuit portions on the ceramic substrate 37 terminal portions which are connected, for example, by lead wires 71 as shown in FIG. 2.

On the head element portions 1R and 1P respectively attached to the first and second shield plates $SH_1$ and $SH_2$, there are formed magnetic medium contact surfaces 4R and 4P as mentioned before. Particularly the magnetic medium contact surfaces 4R and 4P are formed by a special mode. In the first place, the magnetic medium contact surface 4R of one magnetic head element portion 1R will be described with reference to FIG. 7. In this case, the contact surface 4R is polished around the center which is a position displaced inside from the extension of the depth direction of the magnetic gap GR of the head element portion. Specifically, in the prior art magnetic head described in connection with FIG. 1, the polishing of the magnetic medium contact surface is carried out such that as shown by a chain line in FIG. 7, a central axis c of the cylindrical polishing is placed on the extension of the depth direction of the operational magnetic gap GR and upon its attaching it is located with an inclination of a predetermined angle $\theta$. According to the arrangement of this embodiment, the magnetic medium contact surface 4R with the operational magnetic gap GR being faced is formed such that as shown by a solid line in FIG. 7, regarding the surface along the relative movement direction of the magnetic medium is cylindrically polished around the polishing center of the position c which is displaced from the extended direction (extended surface) SR of the depth direction of the gap GR by a predetermined length ls and along an arc b of a predetermined radius of curvature R.

Though not shown, the magnetic medium contact surface 4R of the other head, i.e., the reproducing head element portion 1P is formed such that it is cylindrically polished around the polishing center of the position displaced from the extended direction of the depth direction of the magnetic gap to the direction opposite to that of the recording element portion 1R by length −ls. The first and second magnetic shield plates $SH_1$ and $SH_2$ having the magnetic head element portions 1R and 1P on which the magnetic medium contact surfaces 4R and 4P are respectively formed as described above are bonded or spot-welded together at their back surfaces by by a laser, for example, irradiating a laser spot from the side surfaces thereof for 0.1 to 0.5 seconds and so on.

As described above, in the magnetic gaps GR and GP of both the magnetic head element portions 1R and 1P formed together by bonding the first and second magnetic shield plates $SH_1$ and $SH_2$, the depth directions SR and SP thereof are located in parallel to each other with the reference plane fs along the bonded surface of both the shield plates $SH_1$ and $SH_2$ as the center.

Figure 2:
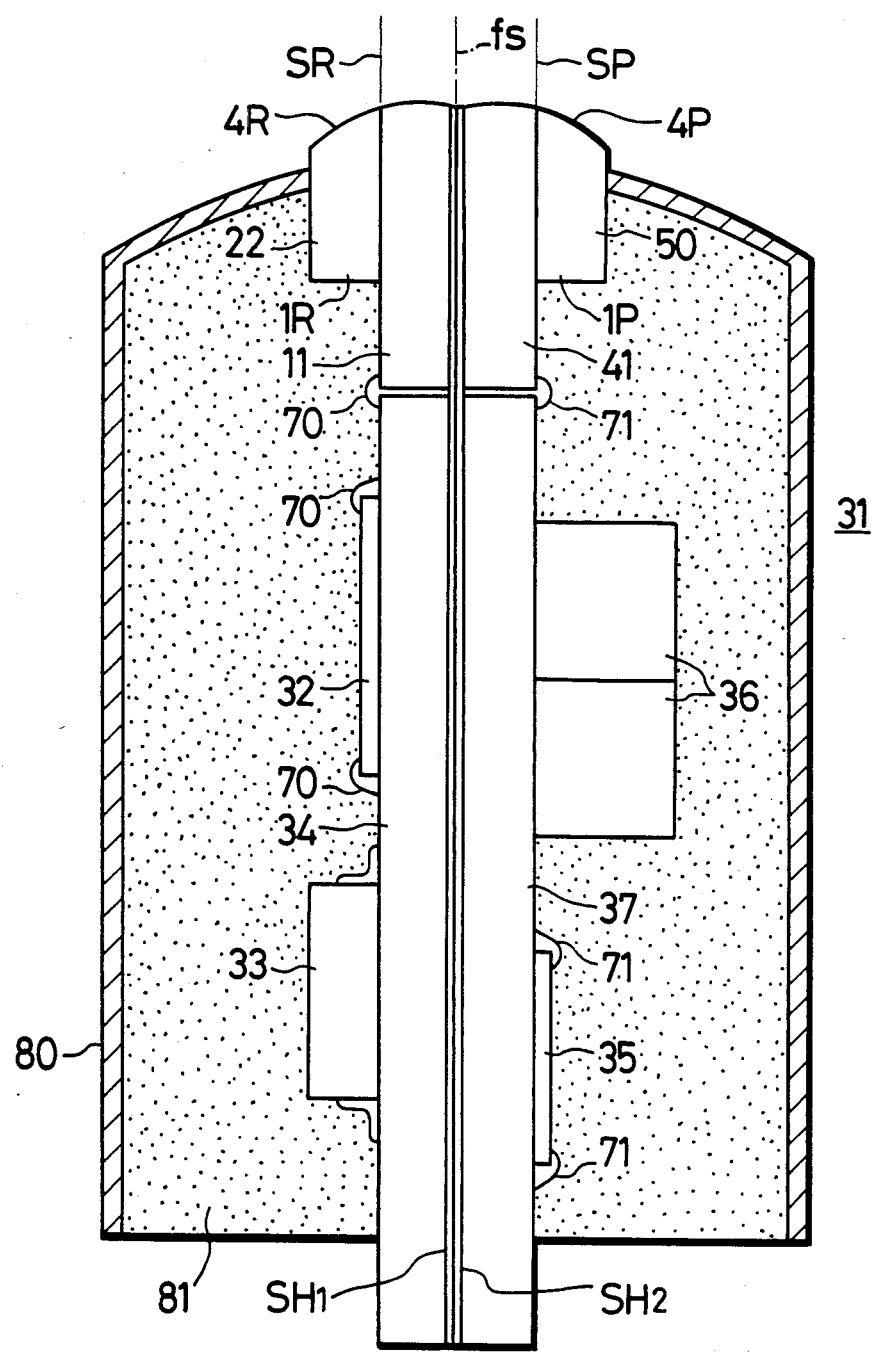
FIG. 2 is a partly sectioned side view of an embodiment of a combination magnetic head apparatus according to the present invention.

In this case, if the above mentioned distance ls is selected as $$ls = R \sin \theta \quad (1)$$

the magnetic medium contact surfaces 4R and 4P of the respective head element portions 1R and 1P according to the embodiment of FIG. 2 can be made coincident with the respective contact surfaces of the prior art shown in FIG. 1. In other words, according to the present invention, although both heads HR and HP are located in parallel to each other, the contact relationships thereof relative to the magnetic medium can be made coincident with those of the prior art structure. In this connection, when R=3 mm and $\theta = 4°$ are established in the prior art structure, from Eq. (1), it is sufficient that ls=200 μm is satisfied in the embodiment of FIG. 2.

Figure 7:
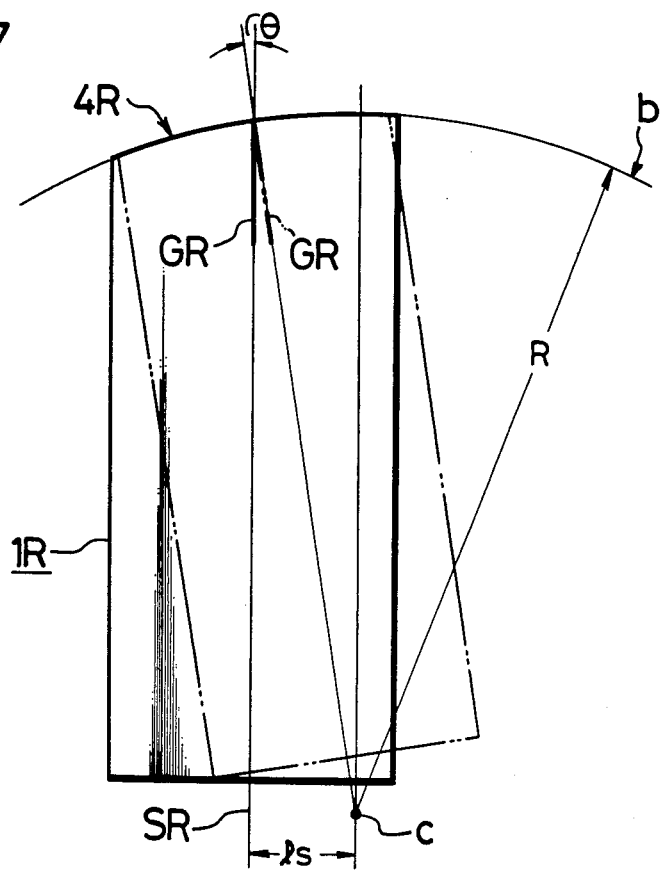
FIGS. 5 and 6 are like cross-sectional view and plan view of a reproducing magnetic head portion thereof and FIG. 7 is an explanatory diagram showing a polishing state of a contact surface of a magnetic gap of a magnetic head apparatus according to the present invention.

Further, an explanation will be given on a pressure of the magnetic medium relative to the magnetic gaps GR and GP in that case. A contact pressure Pg in the depth direction of the magnetic medium having the structure of the present invention shown by the solid line in FIG. 7 is given by the following equation.

$$Pg = P \cos \theta \quad (2)$$

where P is the contact pressure in the depth direction of the like magnetic gap in the prior art structure shown by a chain line in the same figure. W Therefore, if now $\theta = 4°$ is satisfied, Pg=0.998P is established. This makes it clear that Pg is not substantially different from P.

As described above, the bonded member of the first and second magnetic shield plates $SH_1$ and $SH_2$ is inserted into a metal can, that is, a magnetic shield case or can, 80 and resin 81 is filled into the can 80 as shown in FIG. 2.

According to the combination magnetic head of the present invention, since by bonding the first and second magnetic shield plates $SH_1$ and $SH_2$ at their back surfaces which are manufactured with highly-accurate flatness, the respective magnetic head element portions 1R and 1P formed thereon are made together, the positioning between both of them can be made accurately. Further, since the ceramic substrates having mounted thereon the circuit portions accompanying with the respective magnetic head element portions such as the integrated circuits, the capacitors or the like are mounted on the first and second magnetic shield plates $SH_1$ and $SH_2$ and the circuit patterns are formed on the ceramic substrates, it is possible to reduce the number of the lead wires 70 and 71 which are required to interconnect the circuit portions and the head element portions. Furthermore, since both of these head element portions 1R and 1P and the accompanying circuit element portions are covered with the can 80 and are also covered with the resin 81 filled into the can 80, it is possible to improve the humidity proof property and the environment proof property so that the reliability thereof can be improved. In addition, since both the head portions are formed together by bonding the first and second magnetic shield plates $SH_1$ and $SH_2$ and the depth directions SR and SP of the magnetic gaps GR and GP are arranged to have a parallel relationship therebetween, the spacing between both the magnetic gaps GR and GP can be made adequately small so that the overall arrangement can be made small in size and high in density.

We claim:

1. A combination magnetic head apparatus characterized in that a recording head portion in which on one surface of a first magnetic shield plate there are located a recording magnetic head element portion, a recording integrated circuit and a capacitor and a reproducing head portion in which on one surface of a second magnetic shield plate there are located a reproducing magnetic head element portion, a reproducing integrated circuit and a capacitor are bonded together on the other surfaces of said first and second magnetic shield plates and the overall arrangement thereof is incorporated into a shield case, wherein said recording magnetic head element portion includes a thin film magnetic head element formed on a magnetic substrate bonded to said first magnetic shield plate, a protective substrate is bonded thereto so as to cover the same, said reproducing magnetic head element portion includes a thin film magnetic head element formed on a substrate bonded to said second magnetic shield plate, a protective substrate is bonded thereto so as to cover the same, said recording head portion and said reproducing head portion are respectively provided with magnetic medium contact surfaces by cylindrical polishing around a polishing center displaced from an extension of the depth directions of the magnetic gaps.

* * * * *